United States Patent Office 3,658,921
Patented Apr. 25, 1972

3,658,921
PROCESS FOR PRODUCTION OF HALONITRO ALCOHOLS
Richard Wessendorf, Hilden, Rhineland, Germany, assignor to Henkel & Cie G.m.b.H., Dusseldorf-Helthausen, Germany
No Drawing. Filed July 17, 1969, Ser. No. 842,711
Claims priority, application Germany, July 19, 1968,
P 17 68 976.8; Oct. 19, 1968, P 18 04 068.1
Int. Cl. C07c *31/34*
U.S. Cl. 260—633                               14 Claims

ABSTRACT OF THE DISCLOSURE

An improved process for the preparation of halonitro alcohols of the formula $$R_1-\underset{\underset{Br}{|}}{\overset{\overset{OH}{|}}{C}H}-\underset{|}{\overset{R_2}{C}}-NO_2 \quad (I)$$

wherein $R_1$ is selected from the group consisting of hydrogen and methyl optionally substituted with 1 to 3 halogen atoms and $R_2$ is selected from the group consisting of hydrogen and methyl and ethyl optionally substituted with at least one hydroxyl by reaction of a nitroalkane and an aldehyde in an aqueous media.

PRIOR ART

The preparation of aliphatic bromonitro-alcohols of Formula I was previously carried out by the following method. The sodium salt of the desired nitro-alcohol was prepared from a nitroalkane and an aldehyde with sodium alcoholate in alcoholic solution, and the nitro-alcohol was then reacted with bromine in an organic solvent such as ether, chloroform or carbon tetrachloride to give the bromonitro-alcohol. The following scheme illustrates the process.

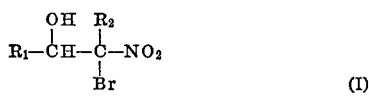

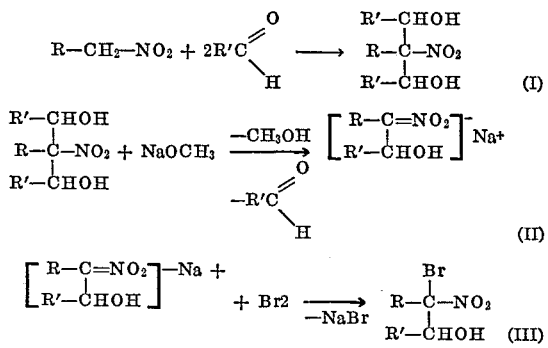

Considerable difficulties are met upon transferring this laboratory process to a commercial scale. The use of highly flammable solvents such as ethanol or ether is only possible in special enclosures and explosion-proof plants. The same applies to the preparation of the alcoholate solutions from metallic sodium and alcohol, which must be freshly made in order to obtain optimum yields. The use of commercially available sodium ethylate, sodium methylate or sodium methylate solution leads to considerable losses in yield. Further, the isolation of the sodium salts of the nitro-alcohols (II) causes great difficulties. Both filtration and purification of the precipitates are very time-consuming, even in small batches. Apart from this, the sodium salts of the nitro-alcohols (II) are not very stable. When kept in the air, decomposition starts with a yellow coloration, even after a short time. Any heating or a slight blow can lead to spontaneous decomposition of the substances.

To eliminate these difficulties, it has been attempted to effect the bromination before the aldol reaction, that is, first to effect the bromination of the nitro-alkane to form the bromitroalkane then to react the resulting bromonitroalkane with the aldehyde to give the corresponding bromonitro-alcohol. While this process is relatively practical for fairly long-chain nitroalkanes, when short-chain nitroalkanes were used, especially nitro-methane, unsatisfactory reaction results were obtained. Thus, by brominating nitromethane in carbon disulfide, bromonitromethane was prepared in approximately 40% yield, which could then be reacted with formaldehyde to give 2-bromo-2-nitro-propanediol. The danger produced by the use of highly flammable solvents could not be eliminated by this method.

OBJECTS OF THE INVENTION

It is an object of the invention to provide a novel process for the preparation of bromonitro-alcohols of Formula I in good yields and without the dangers involved in the case of the flammable organic solvent.

It is another object of the invention to provide a novel two-step process for the preparation of the bromonitro-alcohols of Formula I in an aqueous medium without the separation of any intermediate product.

These and other objects and advantages of the invention will become obvious from the following detailed description.

THE INVENTION

The novel process of the invention for the preparation of bromo-nitro-alcohols of the formula

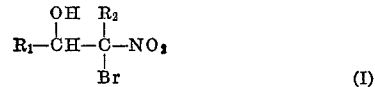

wherein $R_1$ is selected from the group consisting of hydrogen and methyl optionally substituted with 1 to 3 halogen atoms and $R_2$ is selected from the group consisting of hydrogen and methyl and ethyl optionally substituted with at least one hydroxyl comprises reacting a nitroalkane of the formula $R_2$—$CH_2$—$NO_2$ wherein $R_2$ has the above definition with an aldehyde of the formula

wherein $R_1$ has the above definition and an inorganic salt of a member of the group consisting of magnesium and alkaline earth metals in an aqueous media to form the magnesium or alkaline earth metal salt of a nitro-alcohol of the formula

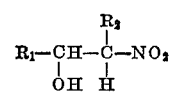

and brominating the latter without isolation in an aqueous suspension at a temperature below 25° C.

The process of the invention is based on the surprising discovery that the magnesium salts and the alkaline earth metal salts, especially the calcium salts, of nitro-alcohols, because of their slight solubility at a pH value around 7, can be directly prepared from a nitroalkane, an aldehyde and a corresponding inorganic salt in an aqueous solution without isolation of intermediate stages, and then can be brominated in the form of their aqueous suspensions without intermediate isolation to give the corresponding bromo-nitro-alcohol of Formula I. The preferred salt is calcium salt.

Examples of suitable aldehydes useful for the process of the invention are, especially, formaldehyde, acetaldehyde, mono-, di- and tri-chloroacetaldehyde. Suitable nitro-alkanes are first and foremost nitromethane, nitroethane and 1-nitropropane. The amounts of nitro-alkane and aldehyde required depend upon the constitution of the desired nitroalcohol and are used in substantially stoichiometric proportion.

The inorganic magnesium or alkaline earth metal salts for the process of the invention may be halides, preferably the chlorides. They are used in amounts of 1 to 3 mol, preferably 1.5 to 2 mol per mol of nitro-alkane. The formation of the magnesium or alkaline earth metal salts of the nitro-alcohols is effected by addition of inorganic bases such as alkaline earth metal or alkali metal hydroxides to the reaction mixture of nitro-alkane, aldehyde and magnesium or alkaline earth metal salt.

In the preparation of the bromonitro-alcohols, the procedure in practice is to allow the required amount of bromine to drop into the cooled aqueous solution or suspension of the magnesium or alkaline earth metal salts of the nitro-alcohols. This very simple and safe preparation of the bromo-nitro-alcohols, however, is not completely satisfactory, as it results in an unavoidable formation of undesired by-products, which impede the separation and working up to the bromonitro-alcohols because of their unpleasant smell, and reduce the yield. These disadvantages are avoided if the bromination is carried out by adding the aqueous solution or suspension of the magnesium or alkaline earth metal salt of the corresponding nitro-alcohols to the required amount of bromine at a temperature below 25° C., preferably between 0 and 20° C.

In the process, the reaction of already formed bromo-nitro-alcohol with the still present salt of the nitro-alcohol, is prevented somewhat in the following way:

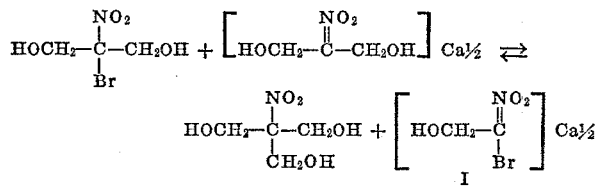

Further bromination then leads to by-products, as for example,

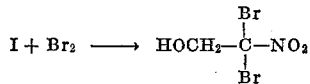

These side reactions, which are avoided in the last described process, cause, however, not only a reduction in the yield, but also the formation of unpleasant smelling substances, e.g. dibromonitro-alkanes and dibromonitro-alcohols which are known from the literature as lachrymatory substances.

To carry out the bromination reaction, the suspension or solution of the salts of the nitro-alcohols is added to the required amount of bromine, which is advantageously dissolved in a halogenated hydrocarbon such as dichloromethane, dichloroethane or chloroform. The speed of the addition depends on the rate of the removal of the heat of reaction, and it must be ensured that the temperature does not exceed 25° C. The temperature range of 0 to 20° C. has been found to be preferred. The end point of the reaction is easily recognized by the disappearance of the bromine color. The process can also be carried out continuously.

The working up of the bromonitro-alcohols is effected in known ways by recrystallization or distillation. Since, however, the crude products are already obtained in a very pure state, in many cases a further purification can be dispensed with.

The bromo-alcohols prepared by the invention are antimicrobial agents with a broad spectrum of activity, low inhibiting concentrations and short killing times.

In the following examples there are described several preferred embodiments to illustrate the invention. However, it should be understood that the invention is not intended to be limited to the specific embodiments.

EXAMPLE I

Preparation of 2-bromo-2-nitro-propane-1,3-diol

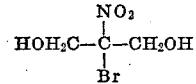

A mixture of 441 g. (3 mols) of calcium chloride dihydrate, 61 g. (1 mol) of nitromethane, 163 g. (2 mols) of formalin (37% formaldehyde solution) and 470 ml. of water was cooled to 0° C. and mixed with 5 g. of calcium hydroxide while stirring. The temperature thereby rose to 30° C. As soon as the temperature had fallen again, a further 32 g. of calcium hydroxide (total of 0.5 mol) were added. The mixture was then cooled to 0° C. and with intensive cooling and stirring, 159.8 g. (1 mol, 51 ml.) of bromine were dropped in at a rate so that the temperature remained at around 0° C. After the addition was ended, the mixture was stirred for a further 2 hours, when the reaction product separated in crystalline form. The product was quickly filtered on a suction filter and the crystalline sludge obtained was taken up in 450 ml. of ethylene chloride and dissolved at reflux. Then by addition of magnesium sulfate, undissolved inorganic salts were separated and the solution was slowly cooled whereby 140 gm. (70% yield) of 2-bromo-2-nitro-propane-1,3-diol precipitated in colorless crystals melting at 123–124° C.

EXAMPLE II

Preparation of 1-bromo-1-nitro-3,3,3-trichloropropanol-2

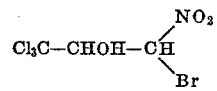

40 g. (1 mol) of sodium hydroxide dissolved in 100 ml. of water were slowly dropped into a mixture of 165.4 g. (1 mol) of chloral hydrate, 294 g. (2 mols) of calcium chloride dihydrate, 61 g. (1 mol) of nitromethane and 600 ml. of water with cooling and vigorous stirring. First 10 ml. were added to start the reaction, and a considerable heating up occurred. The remaining 90 ml. were slowly dropped in only after the temperature had fallen again. After cooling to 0° C., 159.8 g. (1 mol) of bromine were dropped into the suspension of the calcium salt of 1 - nitro-3,3,3-trichloropropanol formed, with intensive cooling and stirring so that the temperature remained about 0° C. The mixture was then stirred for a further hour at 0° C. The 1-bromo-1-nitro-3,3,3-trichloropropanol-2 formed was separated as the lower liquid phase and the aqueous phase was extracted twice with carbon tetrachloride. After distilling the crude product, 173 g. (60% yield) of 1-bromo-1-nitro-3,3,3-trichloropropanol-2 having a boiling point of 77 to 79° C. at 0.003 mm. Hg and a refractive index $n_D^{20} = 1.5330$ were obtained.

EXAMPLE III

Preparation of 2-bromo-2-nitro-butanol-1

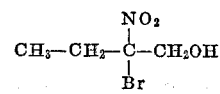

A cold mixture of 178 g. (2 mols) of 1-nitropropane, 163 g. (2 mols) of formalin (37% formaldehyde solution), 468 g. of calcium chloride dihydrate and 950 ml. of water was treated portionwise with 74 g. (1 mol) of calcium hydroxide. The temperature thereby rose to 45° C. After a time, the precipitation of the calcium salt of 2-nitrobutanol-1 began. The suspension was stirred for a further hour and then was treated with 98 ml. of bromine at a temperature between 15° and 20° C. with stirring. Stirring was continued for a further hour at the same temperature. After the addition of 20 ml. of concentrated acetic acid, the 2-bromo-2-nitrobutanol-(1) formed was separated as the lower phase. After extraction of the aqueous phase with carbon tetrachloride, the organic phases were combined and dried over magnesium sulfate. The crude product obtained was distilled in vacuo to obtain 318 g. (80.3% yield) of 2-bromo-2-nitrobutanol-(1) having a boiling point of 84° C. at 2 mm. Hg and a refractive index $n_D^{20}=1.4923$.

EXAMPLE IV

Preparation of 2-bromo-2-nitro-propane-1,3-diol

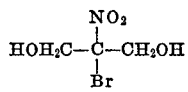

A mixture of 555 g. (2 mols) of a 40% calcium chloride solution, 64 g. (1 mol) of nitromethane (95%) and 50 ml. of formalin (37%) was cooled to 0° C. and then was treated with 20 ml. of sodium hydroxide solution (40 g. (1 mol) dissolved in 230 ml. of water). The temperature thereby rose to 14° C. Then a further 123 ml. of formalin solution (altogether 2 mols) were dropped in so that the reaction temperature was kept at 25° C. while cooling. The remainder of the sodium hydroxide solution was also added at the same temperature. The reaction mixture was stirred for 30 minutes without further cooling. A clear solution was formed, which was dropped with vigorous stirring into a cooled vessel containing 200 ml. of ethylene chloride with 159.8 g. (51 ml., 1 mol) of bromine at such a speed that the reaction temperature was kept at about 5° C. After a short time, the precipitation of 2-bromo-2-nitropropanediol began. The end point of the reaction was recognized by the faint yellow color of the reaction solution. After cooling at 0° C. for an hour, the crystalline product was separated and, after drying recrystallised from ethylene chloride to obtain 168 g. (84% theory) of 2-bromo-2-nitropropane-1,3-diol having a melting point of 118° C.

EXAMPLE V

Preparation of 2-bromo-2-nitro-butanol-1

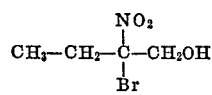

A mixture of 555 g. of calcium chloride solution (40%, 2 mol), 89.1 g. of 1-nitropropane (1 mol) and 20 g. of formalin (37%) was cooled to 0° C. and was treated with 50 ml. of sodium hydroxide solution [40 g. (1 mol) dissolved in 280 ml. of water] with stirring and cooling. The temperature thereby rose to 25° C. Then, a further 61.2 g. (altogether 1 mol) of formalin solution were dropped in so that the reaction temperature was kept at 25° C. while cooling. The remainder of the sodium hydroxide solution was then added at the same temperature. The reaction was stirred for about 30 minutes without further cooling. The suspension formed was introduced with vigorous stirring into a vessel containing 200 ml. of carbon tetrachloride with 159.8 g. (1 mol) of bromine, the temperature being kept around 10° C. by external cooling. The end of the bromination was recognized by the almost colorless reaction solution.

The lower phase was separated, and the aqueous phase was extracted twice with 150 cc. portions of carbon tetrachloride. After drying over magnesium sulfate and distilling off the solvent, 177 g. (89.5% yield) of crude product remained.

Distillation in a high vacuum gave 162.5 g. (82% of theory) of 2-bromo-2-nitro-butanol-1 having a boiling point of 71° C. at 0.1 mm. Hg and a refractive index $n_D^{20}=1.4948$.

EXAMPLE VI

Preparation of 1-bromo-1-nitro-3,3,3-trichloro-propanol-2

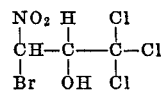

A mixture of 438 g. (2 mol) of calcium chloride hexahydrate, 61 g. (1 mol) of nitromethane, 40 g. of chloral hydrate and 5 g. of calcium hydroxide in 800 cc. of water was heated to 50° C. while stirring and gradually a further 125 g. (altogether 1 mol) of chloral hydrate was added at this temperature. After an hour, 32 g. (altogether 0.5 mol) of calcium hydroxide were added in small portions with good stirring at 20° C. A slightly yellowish suspension of the calcium salt of 1-nitro-3,3,3-trichloropropanol-2 was formed, which after stirring for about 2 hours at room temperature, was introduced into a vessel containing 200 ml. of carbon tetrachloride with 51 ml. (1 mol) of bromine so that the heat formed could be removed by cooling with water. It was stirred for a further hour.

The reaction product was separated as the lower phase; and the aqueous phase was extracted twice with carbon tetrachloride. After drying over magnesium sulfate and distilling off the solvent, 264 g. (92% yield) of crude product remained, from which 244 g. (85% yield) of 1-bromo-1-nitro-3,3,3-trichloro-propanol-2 were obtained by distillation. The product had a boiling point of 77 to 78° C. at 0.01 mm. Hg and a refractive index $n_D^{20}=1.5378$.

The process of the invention has the advantage of a simple preparation of bromonitro-alcohols of Formula I, while avoiding time-consuming isolation of intermediate products, dangerous solvents and, in the modified form, the further advantage of the avoidance of the formation of unpleasant smelling by-products which impede the recovery and reduce the yield. A further advantage is the high purity of the bromonitro-alcohols obtained, so that for many technical purposes a distillation or a recrystallization can be omitted. The saving in time obtainable by the process of the invention amounts to about 50%.

Various modifications of the process of the invention may be made without departing from the spirit or scope thereof.

I claim:

1. A process for the preparation of a bromonitroalcohol of the formula

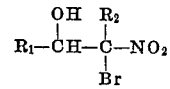

wherein $R_1$ is selected from the group consisting of hydrogen and methyl optionally substituted with 1 to 3 chlorine atoms and $R_2$ is selected from the group consisting of hydrogen and methyl and ethyl optionally substituted with at least one hydroxyl comprises reacting in the presence of an inorganic base selected from the group consisting of alkali metal hydroxides and alkaline earth metal hydroxide a nitroalkane of the formula $$R_2-CH_2-NO_2$$

an aldehyde of the formula

wherein $R_1$ and $R_2$ have the foregoing definitions and a halide salt of alkaline earth metals in water to form the alkaline earth metal salt of a nitro-alcohol of the formula

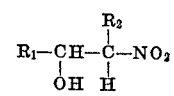

and brominating the latter with bromine without isolation in an aqueous solution or suspension at a temperature below 25° C., 1 to 3 moles of halide salt being used for each mole of nitroalkane and said nitroalkane and said aldehyde being used in substantially stiochiometric proportions.

2. The process of claim 1 wherein the bromination is effected at 0 to 20° C.

3. The process of claim 1 wherein $R_2$ is hydrogen.

4. The process of claim 1 wherein $R_1$ is hydrogen.

5. The process of claim 1 wherein the halide salt is a chloride.

6. The process of claim 1 wherein the halide salt is calcium chloride.

7. The process of claim 1 wherein 1.5 to 2 moles of halide salt are used for each mole of nitro-alkane.

8. A process for the preparation of bromo-nitro-alcohols of the formula

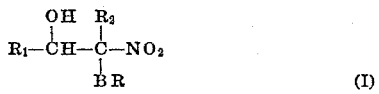

(I)

wherein $R_1$ is selected from the group consisting of hydrogen and methyl optionally substituted with 1 to 3 chlorine atoms and $R_2$ is selected from the group consisting of hydrogen and methyl and ethyl optionally substituted with at least one hydroxyl which comprises reacting in the presence of a member selected from the group consisting of alkali metal and alkaline earth metal hydroxide a nitroalkane of the formula $R_2$—$CH_2$—$NO_2$, an aldehyde of the formula

wherein $R_1$ and $R_2$ have the foregoing definition and the chloride of an alkaline earth metal in water to form the corresponding inorganic salt of the corresponding nitroalcohol and adding the suspension or solution in water of the alkaline earth metal salt of the nitroalcohol to the required amount of bromine at a temperature less than 25° C., 1 to 3 moles of chloride being used for each mole of nitro-alkane and said nitro-alkane and said aldehyde being used in substantially stoichiometric amounts.

9. The process of claim 8 wherein the bromine is dissolved in a solvent selected from the group consisting of chloroform and dichloromethane.

10. The process of claim 8 wherein the bromination is effected at 0 to 20° C.

11. The process of claim 8 wherein $R_2$ is hydrogen.

12. The process of claim 8 wherein $R_1$ is hydrogen.

13. The process of claim 8 wherein the chloride is calcium chloride.

14. The process of claim 8 wherein 1.5 to 2 moles of chloride are used for each mole of nitro-alkane.

References Cited

UNITED STATES PATENTS

| 2,301,259 | 11/1942 | Cox | 260—638 N |
| 2,999,118 | 9/1961 | Bachman et al. | 260—633 |
| 3,162,691 | 12/1964 | Grob | 260—638 N |

FOREIGN PATENTS

| 1,261,278 | 2/1968 | Germany | 260—633 |

HOWARD T. MARS, Primary Examiner